United States Patent
Seltzer et al.

(10) Patent No.: US 11,115,472 B2
(45) Date of Patent: Sep. 7, 2021

(54) DISTRIBUTED CLOUD FILE STORAGE

(71) Applicant: Pryon Incorporated, Raleigh, NC (US)

(72) Inventors: Chris Timothy Seltzer, Bessemer, PA (US); Igor Jablokov, Raleigh, NC (US)

(73) Assignee: Pryon Incorporated, Raleigh, NC (US)

( * ) Notice: Subject to any disclaimer, the term of this patent is extended or adjusted under 35 U.S.C. 154(b) by 0 days.

(21) Appl. No.: 16/781,086

(22) Filed: Feb. 4, 2020

(65) Prior Publication Data
US 2020/0244735 A1    Jul. 30, 2020

Related U.S. Application Data

(63) Continuation of application No. 14/788,618, filed on Jun. 30, 2015, now abandoned.

(60) Provisional application No. 62/018,964, filed on Jun. 30, 2014.

(51) Int. Cl.
*G06F 15/173* (2006.01)
*H04L 29/08* (2006.01)

(52) U.S. Cl.
CPC .................. *H04L 67/1097* (2013.01)

(58) Field of Classification Search
CPC .................................................. H04L 67/1097
USPC ................ 709/201, 205, 217, 218, 226, 203
See application file for complete search history.

(56) References Cited

U.S. PATENT DOCUMENTS

| | | | | |
|---|---|---|---|---|
| 4,266,242 A | * | 5/1981 | McCoy | H04N 5/262 348/561 |
| 8,184,596 B2 | * | 5/2012 | Karlsson | H04W 16/14 370/335 |
| 2004/0133652 A1 | * | 7/2004 | Miloushev | G06F 11/1076 709/214 |
| 2007/0276919 A1 | * | 11/2007 | Buchmann | G06F 16/2471 709/217 |
| 2011/0055881 A1 | * | 3/2011 | Yu | H04N 21/2387 725/88 |
| 2012/0066752 A1 | * | 3/2012 | Vysogorets | G06F 21/34 726/7 |
| 2013/0218585 A1 | * | 8/2013 | Watterson | G06F 19/00 705/2 |
| 2014/0019755 A1 | * | 1/2014 | Gerstner | G06F 21/6227 713/165 |
| 2014/0108617 A1 | * | 4/2014 | Gerstner | G06F 21/6272 709/219 |
| 2014/0136832 A1 | * | 5/2014 | Klum | G06F 21/6218 713/150 |
| 2014/0279846 A1 | * | 9/2014 | Srinivasan | G06F 16/93 707/608 |
| 2014/0337928 A1 | * | 11/2014 | Hirakata | H04L 63/105 726/4 |

* cited by examiner

*Primary Examiner* — Liang Che A Wang

(74) *Attorney, Agent, or Firm* — Occhiuti & Rohlicek LLP

(57) ABSTRACT

Distributed cloud-based data storage divides a file for storage into a number of portions that are separately stored with two or more storage service providers. The division and/or transmission of the file may be implemented based on arbitrary criteria, including random selection, an applied storage policy or assignment of a given portion to a corresponding storage service provider as examples. One or more portions of the file may be assembled into an upload file that is transmitted to and received from a storage provider. The portions of the file received from the storage provider may be used to reconstruct the file.

21 Claims, 4 Drawing Sheets

300

400

DISTRIBUTED CLOUD FILE STORAGE

CROSS-REFERENCE TO RELATED APPLICATIONS

This application claims the benefit of U.S. Provisional Application No. 62/018,964, filed Jun. 30, 2014, entitled "DISTRIBUTED CLOUD FILE STORAGE SOFTWARE," the entire disclosure of which is hereby incorporated herein by reference.

BACKGROUND

Conventional cloud storage tends to be accessed via a single source or single provider. For example, cloud storage services are generally offered and operated by a single company or entity. Due to the nature of being a single source or a single provider, cloud data storage services tend to be highly sensitive to various internal and external influences. For example, various cloud storage sources or providers may have experienced technical error, natural disaster, malicious attacks, loss of data, downtime or other events or situations that may limit access to or actually destroy data. In addition, different legal systems or governance may have separate requirements for treatment of or divulgement of data from cloud data storage providers that offer services in different countries or jurisdictions. Cloud data storage providers may also cease operation as an entity, with the fate of the storage services or data being uncertain.

The above issues thus sensitize cloud data storage service obtained from a single source or single provider to data integrity, security and availability issues, as examples. The centralization of data infrastructure with a single source or single provider thus tends to centralize risk. Accordingly, while cloud storage generally offers convenience of access and large volume storage, among other advantages, a user of such a service typically surrenders a certain amount of control over the data stored in a cloud-based system.

SUMMARY

Techniques and implementations are discussed herein for distributed cloud-based data storage. The storage may be distributed across a number of service sources or providers, referred to herein collectively as "providers." By distributing data across multiple providers users decrease their dependency on a single provider and greatly increase the security, reliability, and speed of cloud file storage.

Cohesive data, such as may be organized as a file, may be divided or split into a number of portions, with the portions being distributed across a number of providers. The division of data may be arranged such that some or all of the portions are redundant, or include redundant components. The redundancy permits the data to be completely reconstructed from less than all the portions. By splitting files across several cloud storage providers, user's data is safe even if multiple providers are compromised. By building redundancy into the system, users are able to access their data even if one or more providers are offline.

The use of several providers for distributed storage of the data may obtain a relatively widespread geographic distribution of physical data storage. The geographic distribution of servers used by different providers to store or manage storage of cloud-based data may provide users with greater flexibility in controlling where their data resides than would be available from a single provider. In addition, speed of data storage and/or data retrieval can be controlled through the use of a number of providers. Pathways can be established for data transmission between a user and multiple providers so that data can be transmitted in parallel for a given data set or file.

According to some implementation examples, a facility is provided to configure how cloud-based data is distributed among a number of providers. The facility may, for example, permit users to change the distribution of their data between services or providers. The distribution can be established to respond dynamically to various parameters, such as speed of storage, cost based on usage metrics and/or service agreements, data integrity, data security and/or data availability, as examples, in relation to providers or other phenomena.

The disclosed implementations and techniques discussed herein permit users to spread data-related risk across multiple providers. The spread of risk across multiple providers contributes to reducing issues related to single points of failure that may otherwise be raised with single sources or single providers of cloud-based data storage. The distribution of data across multiple providers may thus contribute to decreasing a user's dependency on a single provider and increase the security, reliability, and speed of cloud data storage.

BRIEF DESCRIPTION OF THE DRAWINGS

The disclosure is described in greater detail below, with reference to the accompanying drawings, in which.

DETAILED DESCRIPTION

Figure 1:
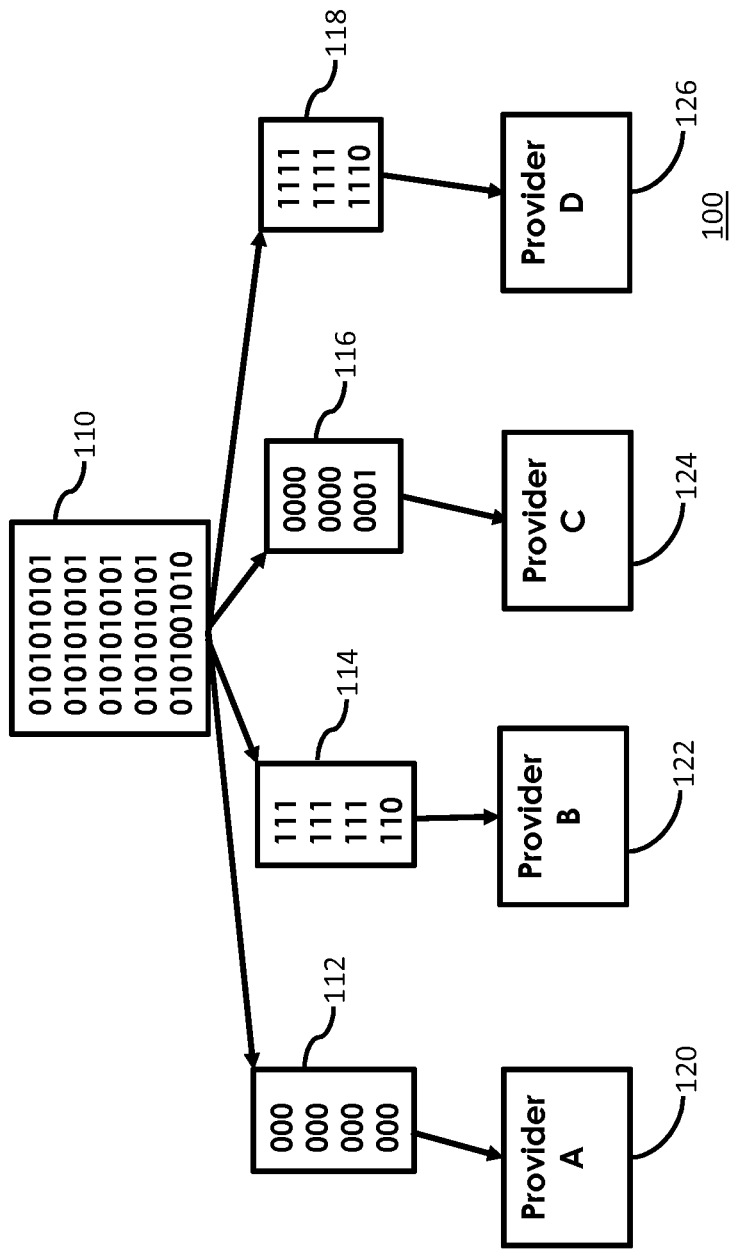
FIG. 1 is a block diagram of a distributed storage configuration according to an example implementation.

Various embodiments are described more fully below with reference to the accompanying drawings, which form a part hereof, and which show specific example embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Distributed cloud file storage software is disclosed. By distributing data across multiple providers, dependency on a single provider is decreased, and security, reliability, and speed of cloud file storage are increased.

Referring to FIG. 1, a distributed storage configuration 100 is illustrated. A file 110 is used as a source file for the distributed storage of data. File 110 is divided into portions 112, 114, 116 and 118. The division of file 110 into portions 112-118 can be implemented according to a number of techniques and/or methods. For example, file 110 may be divided into bytes of data, and each byte can be assigned to one or more of portions 112-118. The assignment of bytes to portions 112-118 can be done according to a sequence, for example. Portion 112 may be assigned a first byte, portion 114 may be assigned a second byte, portion 116 may be assigned a third byte, portion 118 may be assigned a fourth byte, portion 112 may be assigned a fifth byte, and so forth. The assignment of data to portions 112-118 may be based on a number of different criteria, including which provider is to store a respective portion, cost of storage, storage performance, network characteristics, geography, redundancy, available providers, error checking, authentication, and/or any other type of criteria that may contribute to implementing storage operations.

While four portions 112-118 are illustrated in storage configuration 100, it should be understood that any number of portions may be used. The number of portions may be less than, equal to or greater than the number of providers. Some or all of portions 112-118 may be represented as one or more files. For example, some or all of portions 112-118 may represent several sub-portions or files that each includes constituent data that is arranged to achieve various storage policy goals. A storage policy may be implemented that directly or indirectly designates one or more of portions 112-118, or sub-portions thereof, for storage with a particular provider. As discussed above, the provider may be named directly, or it may be selected indirectly by, e.g., specifying the portion, sub-portion, or file to be stored in, e.g., a particular jurisdiction, with a provider having a certain desired cost, a provider reachable through a network having certain characteristics, a provider offering a desired level of redundancy, etc., or to implement any other storage policy desired by the user. Each of the portions, sub-portions or files can be identified at a user station in accordance with a given policy, so that transmission of the desired data to a target provider is implemented in accordance with the policy.

In storage configuration 100, portions 112-118 are each assembled to form a file that is transmitted to a respective provider. Portions 112-118 may be encrypted prior to transmission. Portion 112 is transmitted to provider A (120), portion 114 is transmitted to provider B (122), portion 116 is transmitted to provider C (124) and portion 118 is transmitted to provider D (126). Some of providers 120-126 may be the same, and may represent at least two distinct providers. Each of providers 120-126 may utilize multiple, different geographic locations to implement cloud storage, which geographic locations may be in different legal jurisdictions, or different levels of cloud storage segregated by performance, bandwidth, etc.

Some of the constituent data of portions 112-118 may be redundant across portions 112-118. According to an example, each of portions 112-118 includes redundant data from other ones of portions 112-118. The redundant data is configured to permit file 110 to be completely reconstructed from less than all of portions 112-118. Accordingly, if one of providers 120-126 becomes unavailable, file 110 can still be retrieved from the remaining operative providers. The redundancy can be implemented in accordance with a redundant array of independent disks (RAID) algorithm to attain a desired level of reliability. For example, striping, mirroring and/or parity techniques may be used on a bit, byte or block level to attain a desired level of redundancy. The user may be offered various levels of reliability and/or redundancy, and may be offered various RAID levels, e.g., RAID 0 through RAID 5.

According to an example, the data assigned to portions 112-118 is selected based on an algorithm. The algorithm may be based on a selection of providers 120-126, and/or implementation of a storage policy, as discussed above. An example algorithm may select one or more of providers 120-126 in a random or predetermined sequence, and assign data to a respective portion 112-118 that corresponds to the selected provider(s). An example sequence may consist of provider C, provider B, provider C, provider D, provider A, provider A, . . . and so forth. Data is assigned to a respective portion 112-118 that corresponds to the desired provider in accordance with the configuration of the sequence. For example, a first byte or arbitrarily specified block of data from file 110 may be assigned to portion 116, which corresponds to provider C (124), second data may be assigned to portion 114, which corresponds to provider B (122), and so on in accordance with the configuration of the example sequence noted above. The sequence of providers may be maintained confidentially at a user's terminal, which contributes to the security of the distributed storage arrangement. The reconstruction of file 110 by an entity that does not have the sequence may be extremely difficult, even if the entity can obtain access to portions 112-118, thereby adding to the security of the distributed storage arrangement.

Figure 2:
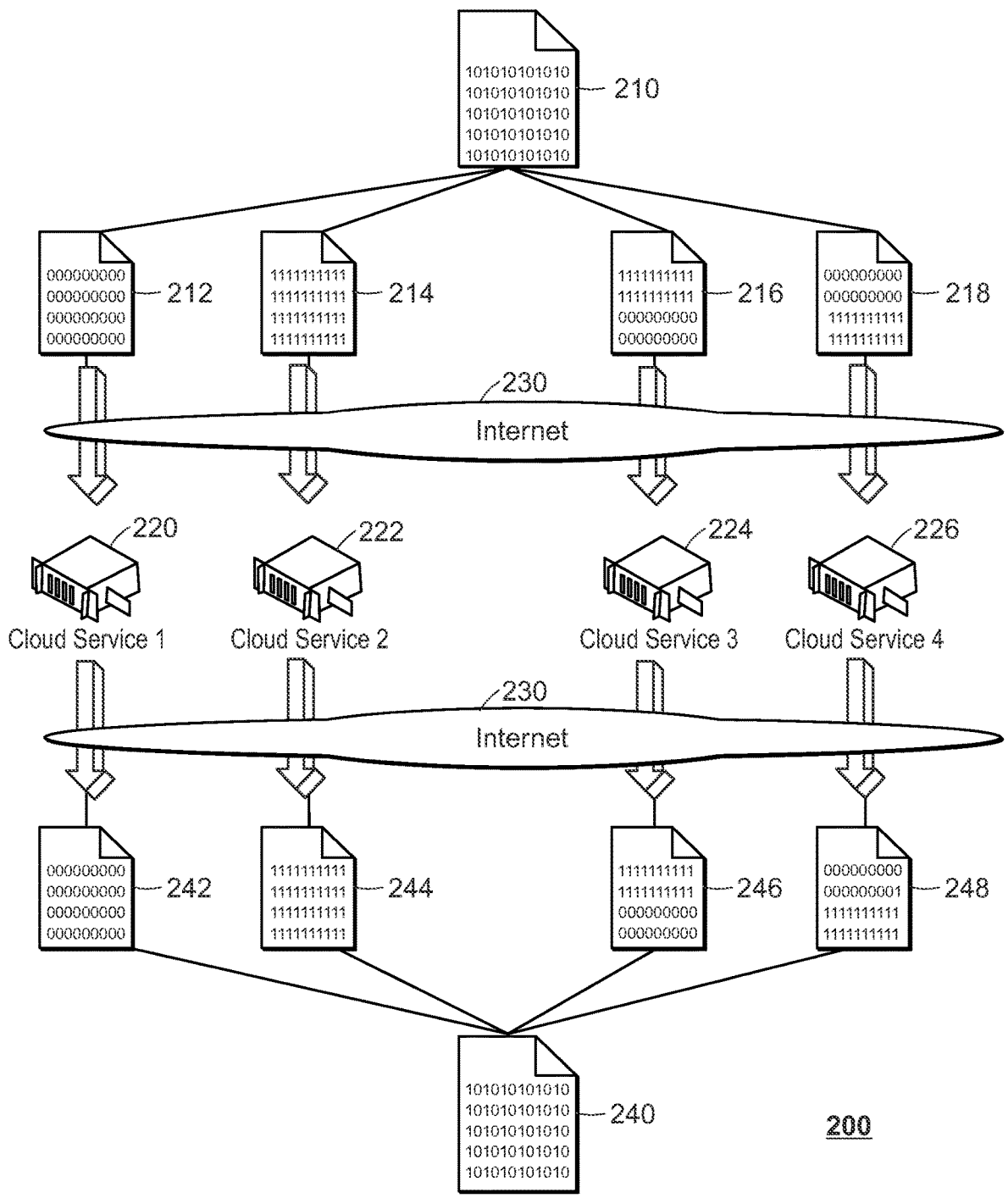
FIG. 2 is a block diagram of a distributed storage and retrieval configuration according to an example implementation.

Referring to FIG. 2, a distributed storage configuration 200 is illustrated. An original file 210 is divided into portions 212, 214, 216 and 218. The division of data among portions 212-218 can be implemented according to any desirable format, criteria, sequence and/or algorithm, such as those discussed above or others. For example, the division may be implemented using a table lookup to determine which constituent data should be assigned to which portion. A sorting algorithm may be used, or a sorting structure such as a tree hierarchy. Portions 212-218 are transmitted to respective cloud service providers 1-4, respectively identified in configuration 200 as cloud service 220, cloud service 222, cloud service 224 and cloud service 226. The transmission of portions 212-218 is implemented through an internet 230, which is a wide-area packet-switched network that is generally publicly available. Although storage configuration 200 illustrates the use of internet 230, any type of communication facility or network for transmission of files may be used. File 210 may be implemented as file 110 (FIG. 1), portions 212-218 may be implemented as portions 112-118 and cloud service 220-226 may be implemented as providers 120-126. Accordingly, portions 212-218 may include redundant data to permit reconstruction of file 210 from less than all of portions 212-218.

A file 240 represents a reconstructed set of data obtained from cloud service 220-226 via a retrieval of each of portions 242, 244, 246 and 248. File 240 may represent an exact copy of file 210. Each of portions 242-248 may represent an exact copy of respective portions 212-218. As discussed above, file 240 may be reconstructed from less than all of portions 242-248. Portions 242-248 retrieved from respective cloud services 220-226 are disassembled to obtain the constituent data that can be reassembled in accordance with the format, criteria, sequence and/or algorithm, such as those discussed above or others, to reconstruct file 210, in the form of file 240. The technique used to implement the division and reconstruction of constituent data can be memorialized or recorded confidentially at a user's terminal, at the time the division takes place, or prior to the division operation.

Portions 212-218 and/or some or all of the constituent data of portions 212-218 may be encrypted prior to transmission to cloud services 220-226. Portions 242-248 retrieved from cloud services 220-226, and/or some or all of the constituent data, may be decrypted following retrieval. In addition, or alternatively, file 210 may be encrypted prior to distributed storage, and decryption may be applied prior to or following reconstruction of file 240.

Figure 3:
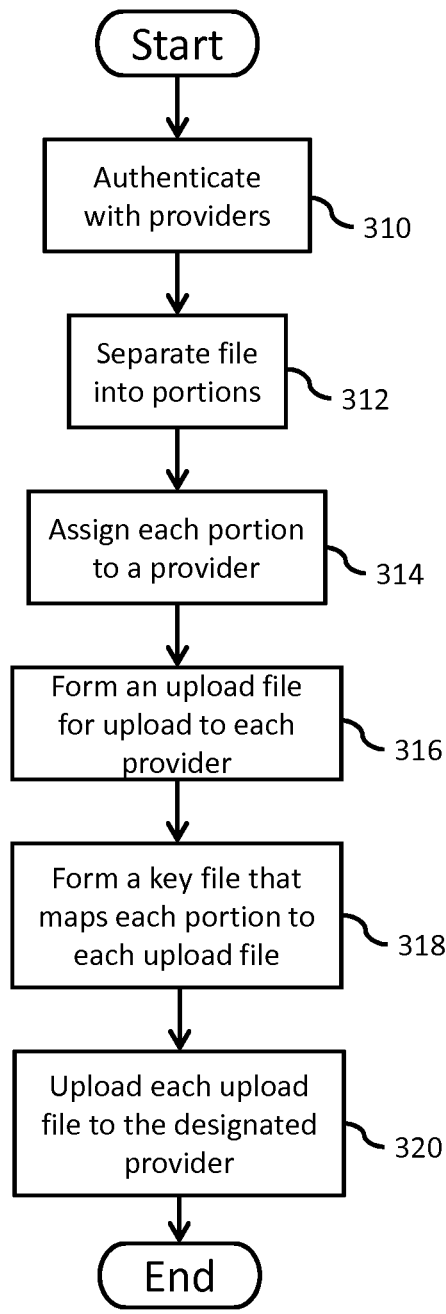
FIG. 3 is a flowchart of a distributed storage example.

Referring to FIG. 3, a flowchart 300 illustrates an example process for uploading a file to distributed storage. The process illustrated in flowchart 300 may take place at a user's terminal, which may be a desktop/laptop computer, smart phone, mobile device, server or terminal in a LAN or enterprise network, or any other user controlled device that can communicate with two or more cloud storage service providers. The process illustrated in flowchart 300 includes authentication with providers, as illustrated in a block 310. The authentication may be implemented with a logon ID and/or password. Authentication may establish permissive usage of the storage service by the user. Authentication may not be necessary for all of the service providers, as identification of the user may suffice for access to the storage service. Access to the storage service by the user device, through authentication or identification, for example, may be deferred until an upload operation. Access to the storage service may be initially confirmed in the process illustrated in flowchart 300, as the availability of the service provider may be used to determine how the file to be stored should be divided.

The file to be stored is separated into constituent data and/or portions as illustrated in a block 312. The portions may include data that is redundant among the discrete portions to enhance the reliability of the stored data. The portions of the file may be bytes that constitute the file. Each portion is assigned to a service provider, as illustrated in a block 314. The assignment of each portion to a service provider may be implemented according to a desired algorithm, sequence format or other criteria or heuristic as discussed previously. The portions of the file that are assigned to each discrete service provider are assembled into a file to be uploaded to the corresponding service provider, as illustrated in a block 316. Portions may be assembled into a number of files for upload to a single service provider.

The criteria used to assign each portion to an upload file associated with a given service provider may be stored in a key file, as illustrated in a block 318. The key file maps each portion to an appropriate location in the upload file and/or the original file for a reconstruction of the original file upon retrieval from the distributed storage.

The upload files created by assembling the portions are uploaded to the service provider to which they are assigned, as illustrated in a block 320. The portions may be located in more than one file for each service provider. The upload process may take place in parallel for each of the service providers, which may benefit storage performance.

Figure 4:
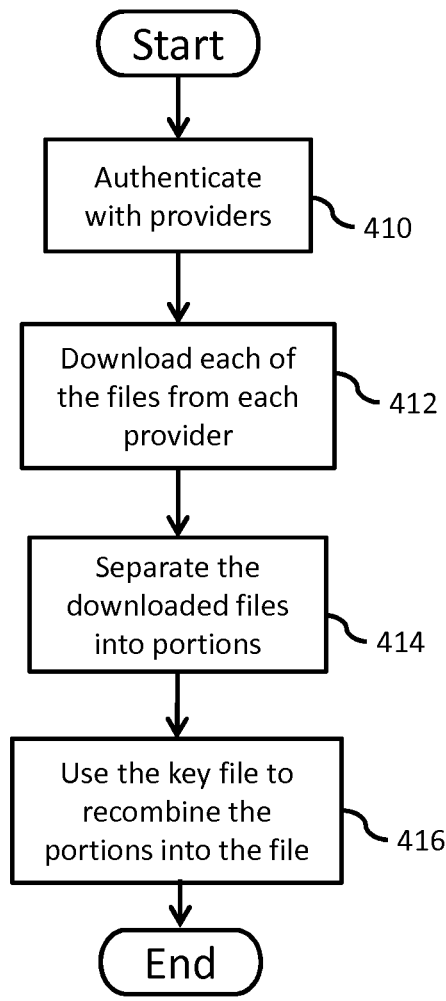
FIG. 4 is a flowchart of a distributed retrieval example.

Referring now to FIG. 4, a flowchart 400 illustrates an example process for downloading data from a distributed storage arrangement. The process illustrated in flowchart 400 may take place at a user's terminal, which may be a desktop/laptop computer, smart phone, mobile device, server or terminal in a LAN or enterprise network, or any other user controlled device that can communicate with two or more cloud storage service providers. The process illustrated in flowchart 400 includes authentication with providers, as illustrated in a block 410. The authentication may be implemented with a logon ID and/or password. Authentication may establish permissive usage of the storage service by the user. Authentication may not be necessary for all of the service providers, as identification of the user may suffice for access to the storage service.

The files previously uploaded to the service providers are downloaded as illustrated in a block 412. The download may take place in parallel for each of the files, which may benefit storage performance. The downloaded files are disassembled or separated into the portions that make up the original file as illustrated in a block 414. Redundant information can be removed before or after disassembly of the downloaded files. The previously formed key file (block 318) is used to indicate how the portions should be recombined into the original file. The portions are combined as indicated by the key file to reconstruct the original file, as illustrated in a block 416. After the key file is used to reconstruct the original file with the portions, it may be destroyed or discarded to contribute to enhancing security of the data.

According to an example, the present disclosure as implemented in software authenticates with various providers prompting the user for credentials where needed. The authentication permissively allows the software to upload and download files from the service providers. By separating each of the files to be uploaded into chunks or portions, the software is able to create faux or secondary files containing only some of the original files data which is then uploaded to the providers. In some examples, the chunks or portions are assigned to providers at random to make it more difficult for an unauthorized entity to reassemble the original file with missing pieces. A key file may be generated to provide a map of which chunks or portions were transmitted to which provider. When the user wishes to access the original file, the faux or secondary files are downloaded, split into chunks or portions and the key file is used to reassemble the chunks or portions to obtain the original file.

According to an example, users may choose to use any number of storage providers greater than two, including three or more. A user may choose the size of the chunks or portions that the files will be split into and also the distribution of the files across providers.

According to an example, disclosed techniques are implemented as software that is able to complete the above-described tasks and to provide the user with the useful tools described hereabove. The disclosed techniques and implementations may be used by a user that runs the software on a computer. The user may designate which files are to be stored in the distributed architecture. The user may specify which services should be used for the distributed storage. The software can run on personal computers, mobile devices and/or servers.

The disclosed techniques and implementations permit distributed storage solutions that are scalable and flexible. According to an example, two or more service providers may be used to implement a distributed storage system. The user can control the distribution of data between the service providers, arbitrarily assigning a percentage of storage to one or more service providers. Enterprise or on-site storage may be designated as a service provider to take advantage of current resources.

The amount of redundancy can be configured to permit users to adopt a trade-off between security and reliability in accordance with a desired storage application. For example, a small amount of redundancy permits more robust security for the data, while a large amount of redundancy results in greater reliability for the data. The disassembly/reconstruction of file data to or from constituent data and/or portions discussed above can occur in real-time or near real-time, or can be implemented at discrete intervals or a scheduled time.

The distribution of data among service providers may also avoid limitations on file size or storage maximums sometimes demanded by service providers. For example, a file that may exceed a size limit for a given service provider can be stored using a distributed configuration in accordance with the present disclosure without exceeding such a size limit. The different portions of the file can be of a size that is significantly smaller than the file size, so that distributed storage of the portions of the file is possible without exceeding a file size limit of a service provider. Similar advantages apply to maximum storage volume for a given service provider.

Due to the parallel nature of distributed storage provided in accordance with the present disclosure, storage performance can be increased over performance of a single service provider. Storage performance may be particularly enhanced depending on the size of files stored in a distributed configuration. For example, storage performance of a single, gigabyte-sized file with a single service provider may be an order of magnitude less, for example, in seconds, than storage performance for a single hundred megabyte file stored with a single service provider. A gigabyte-sized file that is divided for distributed storage into portions that are on the order of hundreds of megabytes can thus benefit from the enhanced performance capability of the service providers being used in parallel.

According to an example, the distributed storage can be implemented to appear to be, or actually be, a folder on a user's mass storage device, such as a hard drive. The folder can be monitored by an application or software implementing an example of the present disclosure to accept files placed in the folder for distributed storage, and to recover files from distributed storage. Accordingly, files that are dragged or dropped into the folder may be automatically and/or transparently deconstructed and uploaded for distributed storage. Files located in the folder that are opened or copied, for example, may be automatically and/or transparently downloaded and reconstructed from distributed storage.

According to an example, folders can be configured according to the present disclosure to implement storage policies. For example, folders can be configured with software or programming in accordance with the present disclosure to implement such policies as storage in a certain jurisdiction, storage with a certain level of security, redundancy and/or reliability, storage with a desired level of performance and/or cost, or any other type of storage policy. According to an example, a user can run a configuration program that can designate a folder to have a certain storage policy. The user can customize folder settings using the configuration program, for example by making selections via a user interface presentation to set a desired level of security, authentication or access for a folder. When the user causes a file to be inserted into the folder, the policy is applied and the file is divided and distributed among storage providers in accordance with the policy. Such folder personalities or customizations can be implemented to operate as a control for directing portions of a file to a particular destination and/or storage provider.

According to an example, the portions derived from a file can be composed of or coupled with other file portions or other data. For example, security portions can be constructed to implement a security protocol, and the security portions can be combined with other portions of a file to enhance the security of the file portions. A file portion may be combined with one or more other portions or data that is randomly or purposefully generated, which combination may help to obscure the original or desired file data. In addition, or alternatively, a file portion may be packaged for transmission to obscure the contents. For example, the file portion may be packaged to emulate other types of file traffic during transmission, so that eavesdropping mechanisms may be confused or not identify the file portion as belonging to the user or the original file.

The disclosed techniques and implementations attain a number of advantages, including multiple layers and/or sources of security through the use of multiple services to compromise by a successful attacker. The redundancy in the distributed data permits the user to retrieve their data even if a storage service goes off-line temporarily or permanently. The distributed, redundant data is preserved from corruption and/or loss that may occur on the part of a storage provider. Distribution of data across a number of service providers protects the confidentiality of the data, since no single service provider has knowledge of the entire contents of the data. Users are also is provided with greater control over how and where the data is stored, which permits the user to optimize data storage in accordance with arbitrary criteria, such as speed, cost, jurisdiction, geographical location or volume, as examples.

Figure 5:
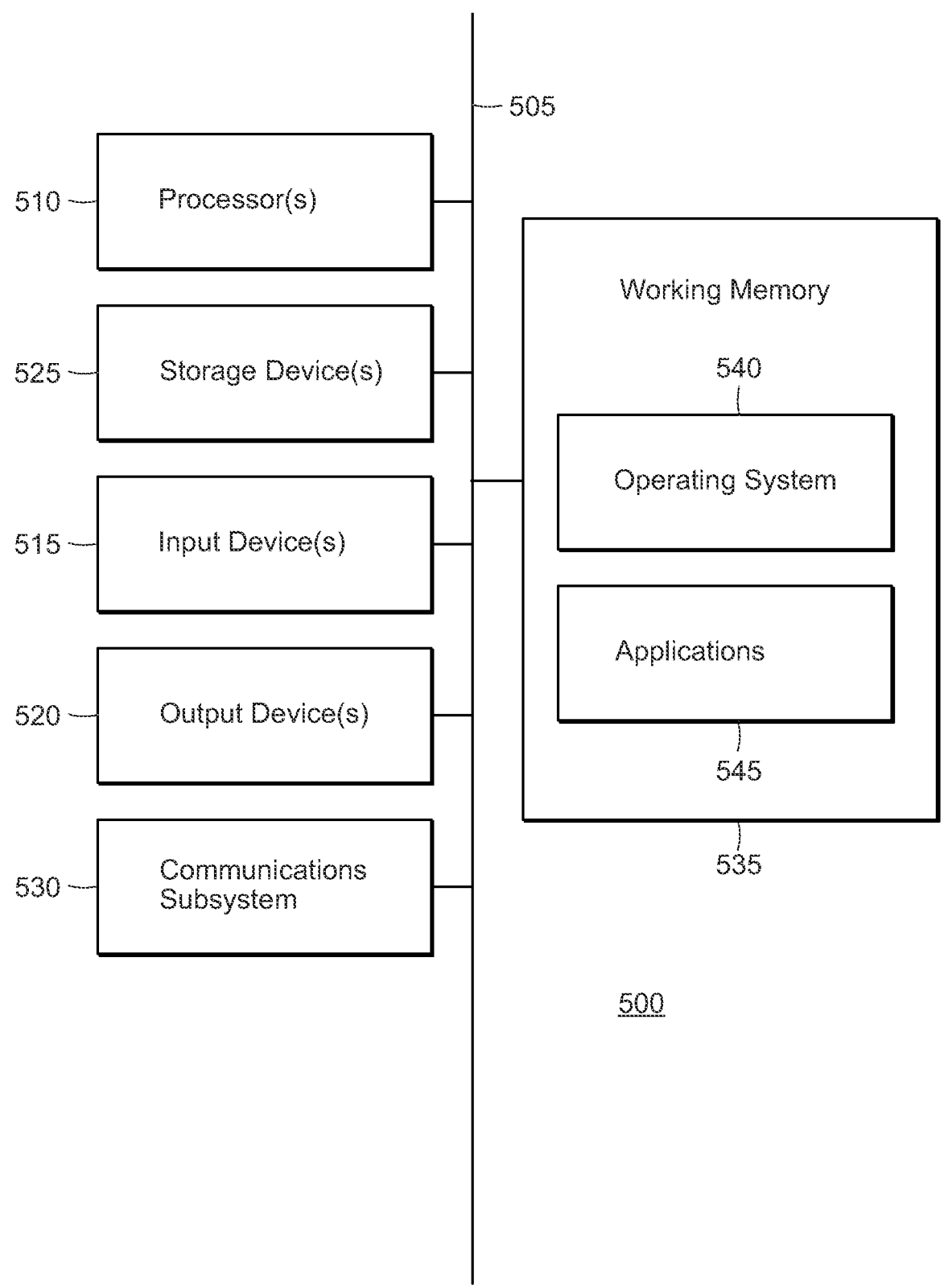
FIG. 5 is a block diagram of an example computer system.

A computer system as illustrated in FIG. 5 may incorporate or implement some of the previously described devices or methods. FIG. 5 provides a schematic illustration of one embodiment of a computer system 500 that can perform the methods provided by various other embodiments, as described herein, and/or can function as the host computer system, a remote kiosk/terminal, a point-of-sale device, a mobile device, and/or a computer system. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as the system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the spirit of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The invention claimed is:

1. A method for storing distributed data, comprising:
dividing a set of data into at least a first portion and at least a second portion;
transmitting the at least first portion to a first storage service provider; and
transmitting the at least second portion to a second storage service provider;
wherein dividing the set of data into the at least the first portion and the at least the second portion comprises:
dividing the set of data at a user terminal into at least three different portions according to a confidential division technique recorded at the user terminal, wherein the confidential division technique specifies a sequence for assigning different parts of the set of data to each of the at least three different portions, and additionally specifies two or more different storage service providers to respectively send the at least three different portions;
and wherein each of the at least three different portions is smaller than the set of data, with each portion including redundant data corresponding to data included in at least another one of the at least three different portions such that complete reconstruction of the set of data is achieved with fewer than the at least three different portions retrieved from respective ones of the two or more different storage service providers.

2. The method according to claim 1, further comprising dividing the set of data in accordance with a criteria.

3. The method according to claim 2, wherein the criteria is one or more of a format, the sequence or an algorithm.

4. The method according to claim 2, wherein the criteria is random selection.

5. The method according to claim 2, wherein the criteria is based on assignment to the first storage service provider or to the second storage service provider.

6. The method according to claim 2, wherein the criteria is based on a service providers sequence that includes the first storage service provider and the second storage service provider.

7. The method according to claim 6, wherein the service providers sequence is randomly selected.

8. The method according to claim 1, further comprising:
arranging the at least first portion in a first file;
arranging the at least second portion in a second file;
transmitting the first file to the first storage service provider; and
transmitting the second file to the second storage service provider.

9. The method according to claim 1, further comprising forming a key file that indicates how the set of data is divided into the at least first portion and the at least second portion.

10. A method for retrieving distributed data, comprising:
receiving a first file from a first storage service provider, the first file previously assembled, at least partly, from a data portion formed from dividing a set of data at a remote terminal to multiple data portions, and with the first file previously uploaded to the first storage service provider;
receiving a second file from a second storage service provider, with the second file previously assembled, at least partly, from another data portion formed from dividing the set of data at the remote terminal, and with the second file previously uploaded to the second storage service provider;
extracting a first portion of a data set from the first file;
extracting a second portion of the data set from the second file; and
reconstructing the data set using the first portion and the second portion;
wherein dividing the set of data at the remote terminal into the multiple data portions comprises:
dividing the set of data at the remote terminal into at least three different portions according to a confidential division technique recorded at the remote terminal, wherein the confidential division technique specifies a sequence for assigning different parts of the set of data to each of at the least three different portions, and additionally specifies two or more different storage service providers to respectively send the at least three different portions;
and wherein each of the at least three different portions is smaller than the set of data, with each portion including redundant data corresponding to data included in at least another one of the at least three different portions such that complete reconstruction of the set of data is achieved with fewer than the at least three different portions retrieved from respective ones of the two or more different storage service providers.

11. The method according to claim 10, further comprising reconstructing the data set in accordance with a criteria.

12. The method according to claim 11, wherein the criteria is one or more of a format, the sequence or an algorithm.

13. The method according to claim 11, further comprising obtaining the criteria from a key file that indicates how the data set is to be reconstructed.

14. A non-transitory machine-readable storage medium comprising machine-readable instructions configured to be executed by a machine to cause the machine to:
divide a set of data into at least a first portion and at least a second portion;
transmit the at least first portion to a first storage service provider;
transmit the at least second portion to a second storage service provider;
receive the at least first portion from the first storage service provider;
receive the at least second portion from the second storage service provider; and
reconstruct the set of data using the first portion and the second portion;
wherein the instructions to cause the machine to divide the set of data into the at least the first portion and the at least the second portion comprise one or more instructions to cause the machine to:
divide the set of data at a user terminal into at least three different portions according to a confidential division technique recorded at the user terminal, wherein the confidential division technique specifies a sequence for assigning different parts of the set of data to each of the at least three different portions, and additionally specifies two or more different storage service providers to respectively send the at least three different portions;

and wherein each of the at least three different portions is smaller than the set of data, with each portion including redundant data corresponding to data included in at least another one of the at least three different portions such that complete reconstruction of the set of data is achieved with fewer than the at least three different portions retrieved from respective ones of the two or more different storage service providers.

15. The medium according to claim 14, further comprising instructions to divide or reconstruct the set of data in accordance with a criteria.

16. The medium according to claim 15, wherein the criteria is one or more of a format, the sequence or an algorithm.

17. The method according to claim 15, wherein the criteria is based on assignment to the first storage service provider or to the second storage service provider.

18. The method according to claim 15, wherein the criteria is based on a service providers sequence that includes the first storage service provider and the second storage service provider.

19. The method according to claim 15, further comprising additional instructions to form a key file that indicates how the set of data is divided into the at least first portion and the at least second portion.

20. A method for implementing a storage policy in a distributed storage arrangement, comprising:

configuring parameters of the storage policy for storage of a file;
receiving an indicia to apply the storage policy to the file;
dividing the file into at least a first portion and at least a second portion in accordance with the storage policy; and
transmitting the at least first portion or the at least second portion to a storage service provider in accordance with the storage policy;
wherein dividing the file into the at least the first portion and the at least the second portion in accordance with the storage policy comprises:
dividing the set of data at a user terminal into at least three different portions according to a confidential division technique recorded at the user terminal, wherein the confidential division technique specifies a sequence for assigning different parts of the set of data to each of the at least three different portions, and additionally specifies two or more different storage service providers to respectively send the at least three different portions;
and wherein each of the at least three different portions is smaller than the set of data, with each portion including redundant data corresponding to data included in at least another one of the at least three different portions such that complete reconstruction of the set of data is achieved with fewer than the at least three different portions retrieved from respective ones of the two or more different storage service providers.

21. The method of claim 1, further comprising:
reconstructing at the user terminal the set of data from one or more of the at least three different portions, retrieved from two or more storage service providers, according to the confidential division technique recorded at the user terminal.

* * * * *